Fig. 6

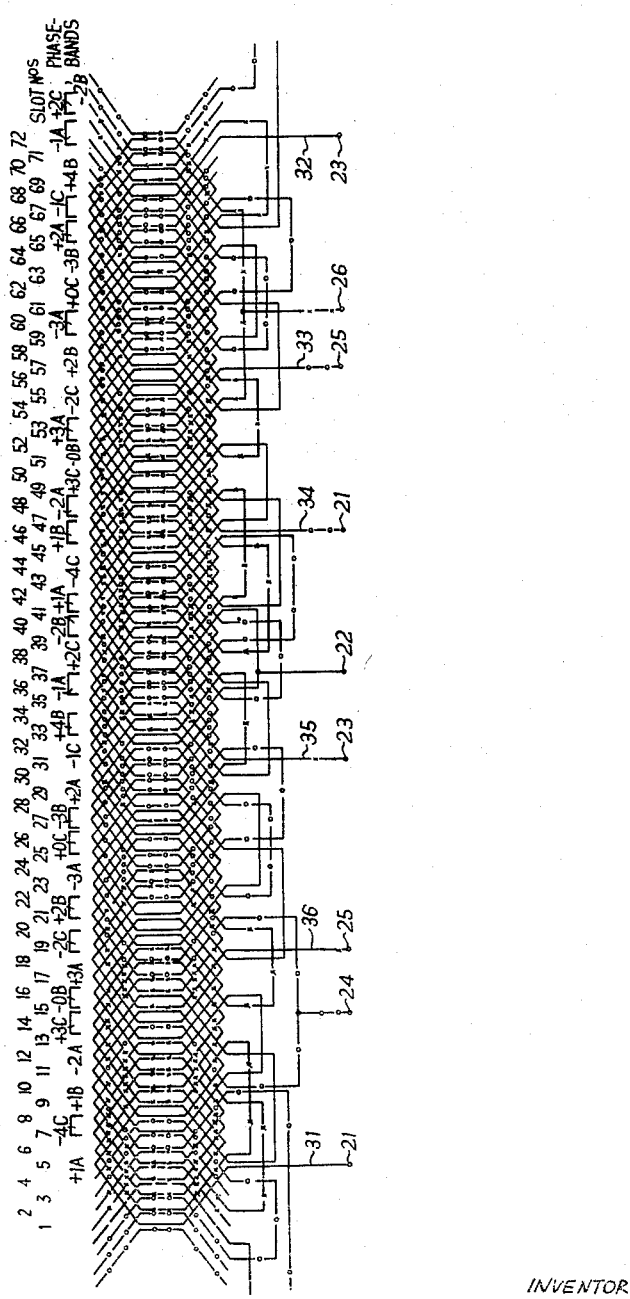

| NUMBER OF SLOTS | | 48 | 60 | | |
|---|---|---|---|---|---|
| PHASE GROUPING | PHASE A | 1-3-3-1-1-3-3-1 | 2-3-3-2-2-3-3-2 | | |
| | PHASE C | 0-3-3-2-0-3-3-2 | 1-3-3-3-1-3-3-3 | | |
| | PHASE B | 2-3-3-0-2-3-3-0 | 3-3-3-1-3-3-3-1 | | |
| TOTAL MODULATING CYCLE (FOR HALF THE PERIMETER) | | 4-3-3-4-3-3-4 | 5-3-4-6-4-3-5 | | |
| EIGHT POLE CONNECTION (UNMODULATED) (SERIES-DELTA) | LAYER FACTOR OF A PHASE | 0.900 | 0.924 | | |
| | LAYER FACTOR OF B&C PHASES | 0.900 | 0.941 | | |
| | ANGLE BETWEEN A&B PHASES | 120° | 121° 9' | | |
| | POSITIVE SEQUENCE LAYER FACTOR | 0.900 | 0.935 | | |
| | NEGATIVE SEQUENCE AS %+VE SEQUENCE | 0 | 0.6% | | |
| SIX POLE CONNECTION (MODULATED) (PARALLEL-STAR) | LAYER FACTOR OF A PHASE | 0.748 | 0.695 | | |
| | LAYER FACTOR OF B&C PHASES | 0.825 | 0.697 | | |
| | ANGLE BETWEEN A&B PHASES | 119° 8' | 119° 57' | | |
| | POSITIVE SEQUENCE LAYER FACTOR | 0.798 | 0.696 | | |
| | NEGATIVE SEQUENCE AS %+VE SEQUENCE | 4.1% | 0.05% | | |
| COIL-PITCH, IN NUMBER OF SLOTS | | 8 | 9 | 10 | 11 |
| CHORDING FACTORS | FOR 8 POLES | 0.866 | 0.707 | 0.866 | 0.743 |
| | FOR 6 POLES | 1.000 | 0.981 | 1.000 | 0.988 |
| WINDING FACTORS | FOR 8 POLES | 0.780 | 0.636 | 0.810 | 0.695 |
| | FOR 6 POLES | 0.798 | 0.784 | 0.696 | 0.688 |
| CHORDING FACTOR FOR CONJUGATE (22-POLE) HARMONIC | | 0.500 | 0.191 | 0.500 | 0.052 |
| RATIO OF FLUX DENSITIES $\frac{B_8}{B_6}$ | | 1.18 | 1.42 | 0.99 | 1.14 |

Fig. 7

| NUMBER OF SLOTS | | 72 | 84 |
|---|---|---|---|
| PHASE GROUPING | PHASE A | 2-4-4-2-2-4-4-2 | 2-5-5-2-2-5-5-2 |
| | PHASE C | 1-3-5-3-1-3-5-3 | 1-5-4-4-1-5-4-4 |
| | PHASE B | 3-5-3-1-3-5-3-1 | 4-4-5-1-4-4-5-1 |
| TOTAL MODULATING CYCLE (FOR HALF THE PERIMETER) | | 5-5-5-6-5-5-5 | 7-4-6-8-6-4-7 |
| EIGHT POLE CONNECTION (UNMODULATED) (SERIES-DELTA) | LAYER FACTOR OF A PHASE | 0.931 | 0.880 |
| | LAYER FACTOR OF B & C PHASES | 0.931 | 0.934 |
| | ANGLE BETWEEN A & B PHASES | 120° | 123° 30' |
| | POSITIVE SEQUENCE LAYER FACTOR | 0.931 | 0.917 |
| | NEGATIVE SEQUENCE AS %+VE SEQUENCE | 0 | 1.9% |
| SIX POLE CONNECTION (MODULATED) (PARALLEL-STAR) | LAYER FACTOR OF A PHASE | 0.783 | 0.739 |
| | LAYER FACTOR OF B & C PHASES | 0.740 | 0.738 |
| | ANGLE BETWEEN A & B PHASES | 118° 59' | 121° 35' |
| | POSITIVE SEQUENCE LAYER FACTOR | 0.753 | 0.738 |
| | NEGATIVE SEQUENCE AS %+VE SEQUENCE | 0.88% | 1.4% |
| COIL-PITCH, IN NUMBER OF SLOTS | | 12 | 13 | 14 | 15 |
| CHORDING FACTORS | FOR 8 POLES | 0.866 | 0.766 | 0.866 | 0.783 |
| | FOR 6 POLES | 1.000 | 0.991 | 1.000 | 0.994 |
| WINDING FACTORS | FOR 8 POLES | 0.807 | 0.713 | 0.795 | 0.717 |
| | FOR 6 POLES | 0.753 | 0.746 | 0.738 | 0.733 |
| CHORDING FACTOR FOR CONJUGATE (22-POLE) HARMONIC | | 0.500 | 0.044 | 0.500 | 0.113 |
| RATIO OF FLUX DENSITIES $\frac{B_8}{B_6}$ | | 1.08 | 1.21 | 1.07 | 1.18 |

Fig. 8

| NUMBER OF SLOTS | | 96 | 108 | | |
|---|---|---|---|---|---|
| PHASE GROUPING | PHASE A | 2-6-6-2-2-6-6-2 | 2-7-7-2-2-7-7-2 | | |
| | PHASE C | 0-6-6-4-0-6-6-4 | 1-6-7-4-1-6-7-4 | | |
| | PHASE B | 4-6-6-0-4-6-6-0 | 4-7-6-1-4-7-6-1 | | |
| TOTAL MODULATING CYCLE (FOR HALF THE PERIMETER) | | 8-6-6-8-6-6-8 | 8-7-8-8-8-7-8 | | |
| EIGHT POLE CONNECTION (UNMODULATED) (SERIES-DELTA) | LAYER FACTOR OF A PHASE | 0.895 | 0.907 | | |
| | LAYER FACTOR OF B & C PHASES | 0.895 | 0.922 | | |
| | ANGLE BETWEEN A & B PHASES | 120° | 118° 54' | | |
| | POSITIVE SEQUENCE LAYER FACTOR | 0.895 | 0.918 | | |
| | NEGATIVE SEQUENCE AS % +VE SEQUENCE | 0 | 1.6 % | | |
| SIX POLE CONNECTION (MODULATED) (PARALLEL-STAR) | LAYER FACTOR OF A PHASE | 0.747 | 0.781 | | |
| | LAYER FACTOR OF B & C PHASES | 0.821 | 0.785 | | |
| | ANGLE BETWEEN A & B PHASES | 119° 6' | 121° 7' | | |
| | POSITIVE SEQUENCE LAYER FACTOR | 0.797 | 0.784 | | |
| | NEGATIVE SEQUENCE AS % +VE SEQUENCE | 4.1 % | 1.0 % | | |
| COIL-PITCH, IN NUMBER OF SLOTS | | 16 | 17 | 18 | 19 |
| CHORDING FACTORS | FOR 8 POLES | 0.866 | 0.793 | 0.866 | 0.802 |
| | FOR 6 POLES | 1.000 | 0.995 | 1.000 | 0.996 |
| WINDING FACTORS | FOR 8 POLES | 0.776 | 0.709 | 0.795 | 0.736 |
| | FOR 6 POLES | 0.797 | 0.793 | 0.784 | 0.782 |
| CHORDING FACTOR FOR CONJUGATE (22-POLE) HARMONIC | | 0.500 | 0.172 | 0.500 | 0.208 |
| RATIO OF FLUX DENSITIES $\frac{B_8}{B_6}$ | | 1.19 | 1.29 | 1.14 | 1.23 |

INVENTOR
Gordon Hindle Rawcliffe
BY
Stevens, Davis, Miller & Mosher
ATTORNEYS

Fig. 9

| | | |
|---|---|---|
| NUMBER OF SLOTS | | 120 |
| PHASE GROUPING | PHASE A | 3-7-7-3-3-7-7-3 |
| | PHASE C | 1-7-7-5-1-7-7-5 |
| | PHASE B | 5-7-7-1-5-7-7-1 |
| TOTAL MODULATING CYCLE (FOR HALF THE PERIMETER) | | 10-7-8-10-8-7-10 |
| EIGHT POLE CONNECTION (UNMODULATED) (SERIES-DELTA) | LAYER FACTOR OF A PHASE | 0.915 |
| | LAYER FACTOR OF B&C PHASES | 0.915 |
| | ANGLE BETWEEN A&B PHASES | 120° |
| | POSITIVE SEQUENCE LAYER FACTOR | 0.915 |
| | NEGATIVE SEQUENCE AS % +VE SEQUENCE | 0 |
| SIX POLE CONNECTION (MODULATED) (PARALLEL-STAR) | LAYER FACTOR OF A PHASE | 0.740 |
| | LAYER FACTOR OF B&C PHASES | 0.781 |
| | ANGLE BETWEEN A&B PHASES | 121° 45' |
| | POSITIVE SEQUENCE LAYER FACTOR | 0.767 |
| | NEGATIVE SEQUENCE AS % +VE SEQUENCE | 0.03 % |

| | | | |
|---|---|---|---|
| COIL-PITCH, IN NUMBER OF SLOTS | | 20 | 21 |
| CHORDING FACTORS | FOR 8 POLES | 0.866 | 0.809 |
| | FOR 6 POLES | 1.000 | 0.997 |
| WINDING FACTORS | FOR 8 POLES | 0.793 | 0.740 |
| | FOR 6 POLES | 0.767 | 0.763 |
| CHORDING FACTOR FOR CONJUGATE (22-POLE) HARMONIC | | 0.500 | 0.233 |
| RATIO OF FLUX DENSITIES $\frac{B_8}{B_6}$ | | 1.12 | 1.19 |

Fig. 10

| NUMBER OF SLOTS | 72 | 84 | 96 |
|---|---|---|---|
| PHASE A COIL-GROUP ARRANGEMENT | 1-2-3-3-2-1 | 1-2-4-4-2-1 | 1-3-4-4-3-1 |
| PHASE C COIL-GROUP ARRANGEMENT | 1-2-4-3-2-0 | 1-3-4-4-2-0 | 2-3-5-3-3-0 |
| PHASE B COIL-GROUP ARRANGEMENT | 0-2-3-4-2-1 | 0-2-4-4-3-1 | 0-3-3-5-3-2 |
| TOTAL MODULATING WAVE FOR SEMI-PERIMETER | 3-4-3-3-3-4 -3-3-3-4-3 | 4-4-3-4-4-4 -4-4-3-4-4 | 4-5-5-3-4-6 -4-3-5-5-4 |
| 12-POLE (UNMODULATED) CONNECTION | | | |
| LAYER FACTOR, PHASE A | 0.923 | 0.904 | 0.890 |
| LAYER FACTOR, PHASES B AND C | 0.903 | 0.908 | 0.908 |
| ANGLE BETWEEN RESULTANT VECTORS OF PHASE A AND PHASE C | 242.4° | 240.4° | 239° |
| POSITIVE LAYER FACTOR | 0.908 | 0.907 | 0.902 |
| PERCENTAGE BACKWARD 12-POLE FIELD | 1.65 | 0.55 | 0.37 |
| 10-POLE (MODULATED) CONNECTION | | | |
| LAYER FACTOR, PHASE A | 0.775 | 0.792 | 0.728 |
| LAYER FACTOR, PHASES B AND C | 0.800 | 0.812 | 0.783 |
| ANGLE BETWEEN RESULTANT VECTORS OF PHASE A AND PHASE C | 120.1° | 119.2° | 121.4° |
| POSITIVE LAYER FACTOR | 0.792 | 0.805 | 0.765 |
| PERCENTAGE BACKWARD 10-POLE FIELD | 1.0 | 1.62 | 0.92 |
| COIL-PITCH, IN SLOTS | 8 | 9 | 10 |
| WINDING FACTOR 12-POLE | 0.786 | 0.817 | 0.833 |
| WINDING FACTOR 10-POLE | 0.763 | 0.800 | 0.763 |
| PERCENTAGE CONJUGATE HARMONIC (17th) IN MODULATED CONNECTION | 5.41 | 7.32 | 9.05 |
| (B12/B10) FLUX RATIO | 1.01 | 1.02 | 0.95 |

Additional column (rightmost) values: 11 / 0.750 / 0.745 / 2.29 / 1.03

Fig. 11

| NUMBER OF SLOTS | 108 | 120 | 132 |
|---|---|---|---|
| PHASE A COIL-GROUP ARRANGEMENT | 1-3-5-5-3-1 | 1-4-5-5-4-1 | 1-4-6-6-4-1 |
| PHASE C COIL-GROUP ARRANGEMENT | 2-4-5-4-3-0 | 2-5-5-4-3-1 | 2-5-6-6-3-0 |
| PHASE B COIL-GROUP ARRANGEMENT | 0-3-4-5-4-2 | 1-3-4-5-5-2 | 0-3-6-6-5-2 |
| TOTAL MODULATING WAVE FOR SEMI-PERIMETER | 5-5-5-4-5-6 -5-4-5-5-5 | 6-5-6-5-5-6 -5-5-6-5-6 | 6-6-6-6-6-6 -6-6-6-6-6 |
| 12-POLE (UNMODULATED) CONNECTION | | | |
| LAYER FACTOR, PHASE A | 0.891 | 0.921 | 0.908 |
| LAYER FACTOR, PHASES B AND C | 0.918 | 0.921 | 0.904 |
| ANGLE BETWEEN RESULTANT VECTORS OF PHASE A AND PHASE C | 238.8° | 239.5° | 240.9° |
| POSITIVE LAYER FACTOR | 0.902 | 0.921 | 0.905 |
| PERCENTAGE BACKWARD 12-POLE FIELD | 1.25 | 0.54 | 0.77 |
| 10-POLE (MODULATED) CONNECTION | | | |
| LAYER FACTOR, PHASE A | 0.768 | 0.745 | 0.795 |
| LAYER FACTOR, PHASES B AND C | 0.795 | 0.778 | 0.813 |
| ANGLE BETWEEN RESULTANT VECTORS OF PHASE A AND PHASE C | 121° | 119.3° | 121.6° |
| POSITIVE LAYER FACTOR | 0.786 | 0.767 | 0.807 |
| PERCENTAGE BACKWARD 10-POLE FIELD | 0 | 1.53 | 0.87 |
| COIL-PITCH, IN SLOTS | 11   13 | 12   14 | 13   15 |
| WINDING FACTOR 12-POLE | 0.848  0.781 | 0.875  0.745 | 0.868  0.762 |
| WINDING FACTOR 10-POLE | 0.786  0.774 | 0.767  0.741 | 0.813  0.795 |
| PERCENTAGE CONJUGATE HARMONIC (17th) IN MODULATED CONNECTION | 10.45  2.05 | 12.5   0.83 | 11.9   3.03 |
| (B12/B/10) FLUX RATIO | 0.96   1.03 | 0.91   1.03 | 0.97   1.08 |

Fig. 12

| | 144 | 156 | 168 |
|---|---|---|---|
| NUMBER OF SLOTS | | | |
| PHASE A COIL-GROUP ARRANGEMENT | 1-5-6-6-5-1 | 2-5-6-6-5-2 | 2-5-7-5-5-2 |
| PHASE C COIL-GROUP ARRANGEMENT | 2-6-6-6-4-0 | 3-5-7-6-4-1 | 3-6-7-7-4-1 |
| PHASE B COIL-GROUP ARRANGEMENT | 0-4-6-6-6-2 | 1-4-6-7-5-3 | 1-4-7-7-6-3 |
| TOTAL MODULATING WAVE FOR SEMI-PERIMETER | 7-6-7-6-6-8 -6-6-7-6-7 | 7-7-8-7-6-8 -6-7-8-7-7 | 8-7-8-8-7-8 -7-8-8-7-8 |
| 12-POLE (UNMODULATED) CONNECTION | | | |
| LAYER FACTOR, PHASE A | 0.904 | 0.935 | 0.928 |
| LAYER FACTOR, PHASES B AND C | 0.904 | 0.921 | 0.922 |
| ANGLE BETWEEN RESULTANT VECTORS OF PHASE A AND PHASE C | 240° | 241.2° | 240.5° |
| POSITIVE LAYER FACTOR | 0.904 | 0.925 | 0.924 |
| PERCENTAGE BACKWARD (2-POLE FIELD) | 0 | 0.43 | 0.33 |
| 10-POLE (MODULATED) CONNECTION | | | |
| LAYER FACTOR, PHASE A | 0.788 | 0.744 | 0.760 |
| LAYER FACTOR, PHASES B AND C | 0.803 | 0.764 | 0.773 |
| ANGLE BETWEEN RESULTANT VECTORS OF PHASE A AND PHASE C | 120.2° | 120° | 119.5° |
| POSITIVE LAYER FACTOR | 0.798 | 0.757 | 0.769 |
| PERCENTAGE BACKWARD 10-POLE FIELD | 0.40 | 0.88 | 1.08 |
| COIL-PITCH, IN SLOTS | 15  17 | 16  18 | 17  20 |
| WINDING FACTOR 12-POLE | 0.835  0.717 | 0.865  0.819 | 0.872  0.723 |
| WINDING FACTOR 10-POLE | 0.796  0.766 | 0.756  0.749 | 0.769  0.735 |
| PERCENTAGE CONJUGATE HARMONIC (17th) IN MODULATED CONNECTION | 8.79  0.25 | 11.8  1.98 | 12.36  1.26 |
| (B12/B10) FLUX RATIO | 0.99  1.11 | 0.91  0.95 | 0.92  1.06 |

United States Patent Office 3,175,142
Patented Mar. 23, 1965

3,175,142
ROTARY ELECTRIC MACHINE PROVIDING POLE - CHANGING BY POLE - AMPLITUDE MODULATION
Gordon Hindle Rawcliffe, Clifton, Bristol, England, assignor to National Research Development Corporation, London, England
Filed Apr. 9, 1962, Ser. No. 186,211
Claims priority, application Great Britain, Apr. 14, 1961, 13,500/61; Mar. 6, 1962, 8,552/62
6 Claims. (Cl. 318—224)

This invention relates to three-phase, alternating current, pole-changing rotary electric machines.

It is well known to provide pole-changing A.C. electric motors having either separate sets of phase-windings providing alternative pole-numbers or having a single set of phase-windings, with suitable connections to the coils brought out to a multiple switch, so that the single set of phase-windings can be switched to provide alternative pole-numbers. The most common arrangements provide alternative pole-numbers in the ratio 2:1, and hence alternative operating speeds in the reverse ratio.

Recently, a new principle for providing alternative pole-numbers in a rotary electric machine with a single set of phase-windings has been developed. This principle is known as "Pole-Amplitude Modulation" and has been described in two papers by Professor G. H. Rawcliffe and others, the earlier entitled "Induction Motor Speed-Changing by Pole-Amplitude Modulation" in the Proceedings of the Institution of Electrical Engineers, vol. 105, Part A, No. 22, August 1958, and the latter entitled "Speed-Changing Induction Motors—Further Developments in Pole-Amplitude Modulation" in the Proceedings of the Institution of Electrical Engineers, vol. 107, Part A, No. 36, December 1960.

While the above-mentioned references give a full explanation of the general theory of pole-amplitude modulation it may briefly be said here that a 3-phase, A.C. machine having a single set of three phase-windings wound to provide a first pole number may be adapted to operate at an alternative pole number, in a ratio less than 2.1, if a pole-amplitude modulation wave, that is to say a cyclical pattern of reconnection of the coils, is applied to each phase-winding, the three modulating waves being relatively spaced by 120° around the axis of the machine.

The pole-amplitude modulation of each phase-winding is effected by switching successive portions of the phase-winding around the periphery of the machine so that, in the modulated connection, one portion is reversed in polarity and one portion retains its original polarity for each complete cycle of the modulating wave. In addition, further expedients are employed to ensure that the amplitudes of the poles, in the modulated connection, are not uniform but follow more nearly a sinusoidal amplitude distribution in each modulating wave. To this end, one pole may be omitted at one end of each modulation half-cycle, or both end poles may be reduced in amplitude or the machine may be wound originally as a fractional-slot machine to provide a sinusoidal distribution of the pole amplitude for both the modulated and unmodulated connections.

The form of pole-amplitude modulation described in the above-mentioned publications is known as symmetrical pole-amplitude modulation because, for the modulated pole-number, an identical modulation wave, that is the cyclical pattern of coil reconnections, is applied to each of the three phase windings, each modulation wave being symmetrical about the centre point of the phase winding concerned.

This symmetrical pole-amplitude modulation method is used only when neither of the pole-numbers used is a multiple of three.

British Patent No. 926,101 describes a rather more complicated coil-switching arrangement called asymmetrical pole-amplitude modulation, which is suitable for machines having one pole-number which is a multiple of three.

In short, the method of asymmetrical pole-amplitude modulation consists in applying to any one of the three phase-windings a modulation wave, or pattern of reverse-connected coils, as for symmetrical pole-amplitude modulation. For each of the other two phase-windings, however, two modulation waves are applied, the two waves being spaced apart around the phase-winding periphery so as to produce substantially the same resultant magneto-motive force waveform in the modulated connection, in the same spaced relationship to that of the first phase-winding, as for the simpler case of symmetrical pole-amplitude modulation.

In all the embodiments of the invention described in the above-mentioned co-pending applications, the method of asymmetrical pole-amplitude modulation is carried out by the reversal of selected coils of the phase winding and by the omission or reduction, that is the ommission of some of the conductors, of selected other coils of the phase-winding.

The present invention relates to three-phase rotary electric machines providing alternative pole-numbers one of them being a multiple of three, and hence using the method of asymmetrical pole-amplitude modulation.

The object of the invention is to provide three-phase, alternating current, pole-changing rotary electric machines, wherein pole-changing is effected by the method of asymmetrical pole-amplitude modulation and wherein all the coils of all the phase-windings are included in circuit for both the original and the modulated connections.

The prior art machines with pole-changing by the method of pole-amplitude modulation comprise a three-phase winding providing a first pole-number of P pole-pairs and an alternative pole-number of either (P+M) or (P−M) pole-pairs, having three phase-windings sequentially arranged around an axis, the electrical phase-sequence A, B, C and phase-band sequence +A −C +B −A +C −B defining a reference sense of rotation around said axis, said phase-bands comprising coils connected together in each phase-winding to provide 2P poles, means for connecting selected ones of said coils in an alternative manner to modulate the relative amplitudes of said 2P poles according to three pole-amplitude modulation waves applied one to each phase-winding in spaced relationship, each pole-amplitude modulation wave comprising M cycles of alternate positive and negative parts following sequentially from an origin, said positive and negative parts being identified by reversal of polarity of the poles of said negative part relative to the poles of said positive part, the spaced relationship of said pole-amplitude modulation waves being such as to space the origins thereof at three points spaced apart substantially one-third of a revolution around said axis, the sequence of said pole-amplitude modulation waves at said three spaced points being in the phase sequence A, B, C or in the phase sequence A, C, B in the said reference sense of rotation, as said alternative pole-number is (P+M) pole-pairs or (P−M) pole pairs, respectively.

The present invention now provides a rotary electric machine having a three-phase winding providing a first pole-number of P pole-pairs and an alternative pole-number of either (P+M) pole-pairs or (P−M) pole-pairs, either the first pole-number or the alternative pole-number being three pole-pairs or a multiple of three pole-pairs, the said winding comprising three phase-windings sequentially arranged around an axis, the electrical phase-sequence A, B, C and phase-band sequence +A −C +B −A +C −B defining a reference sense of rotation around said axis, said phase-bands comprising coils connected together to provide P pole-pairs in a first, that is to say unmodulated, manner of connection, means for connecting selected coils in an alternative, that is to say modulated, manner of connection thereby to modulate the relative amplitudes of said P pole-pairs according to three pole-amplitude modulation waves applied one to each of the three phase-windings in spaced relationship, each pole-amplitude modulation wave comprising M cycles of alternate positive and negative parts following sequentially from an origin, said positive and negative parts being identified by reversal of polarity of the poles of said negative part relative to the poles of said positive part, the spaced relationship of said pole-amplitude modulation waves being such as to space the origins thereof at three original points spaced apart substantially one-third of a revolution around said axis, the sequence of the pole-amplitude modulation waves at said three original points being in the phase sequence A, B, C, in the said reference sense of rotation, when said alternative pole-number is $(P+M)$ pole-pairs or being in the phase sequence A, C, B, when said alternative pole-number is $(P-M)$ pole-pairs, wherein the three-phase winding is a fractional-slot winding, the pole-pairs at one or at both ends of each half of each phase-winding having fewer coils than the pole-pairs at the centres thereof, wherein the coil-grouping sequence of phase-winding A is symmetrical about the centre of each half phase-winding and the coil-grouping sequences of phase-windings B and C are asymmetrical about the centre of each phase winding and wherein the said alternative, that is to say modulated, manner of connection of the coils comprises reversing in circuit selected whole phase-bands.

In order that the invention may readily be carried into effect, a number of embodiments thereof will now be described in detail, by way of example, with reference to the accompanying drawings, of which:

For each machine described in the Tables A and B above, two variants are shown using a different coil-pitch in each;

Figure 1:
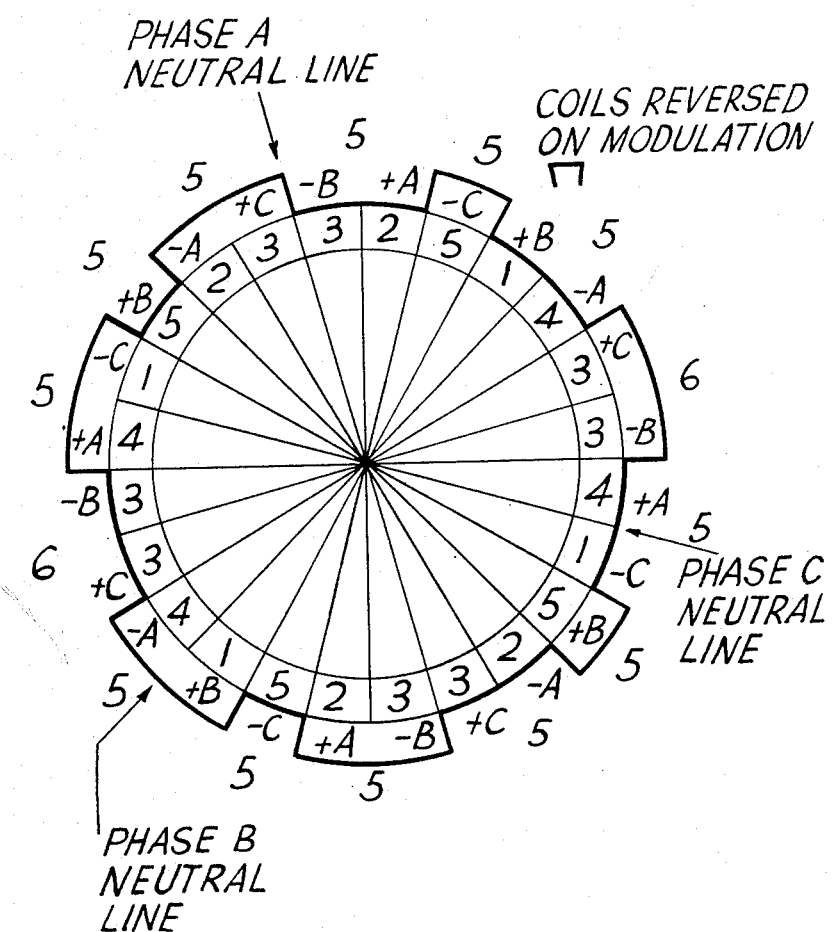
FIG. 1 is a clock-diagram for the 8-pole/6-pole machine wound on a 72-slot frame, which is Example 1 of Table A.2.
Figure 2:
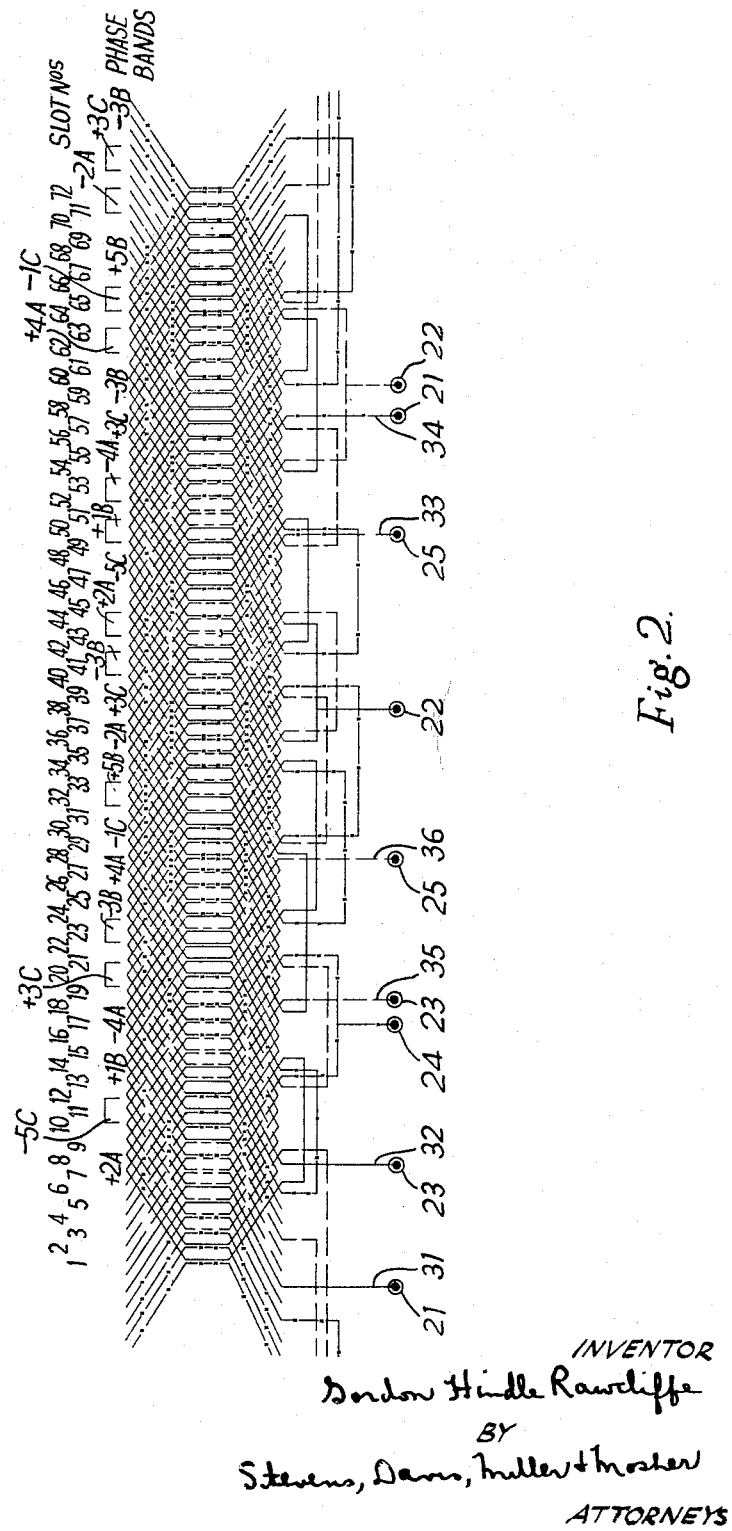
FIG. 2 is a slot winding diagram for the 8-pole/6-pole machine of FIG. 1.
Figure 3B:
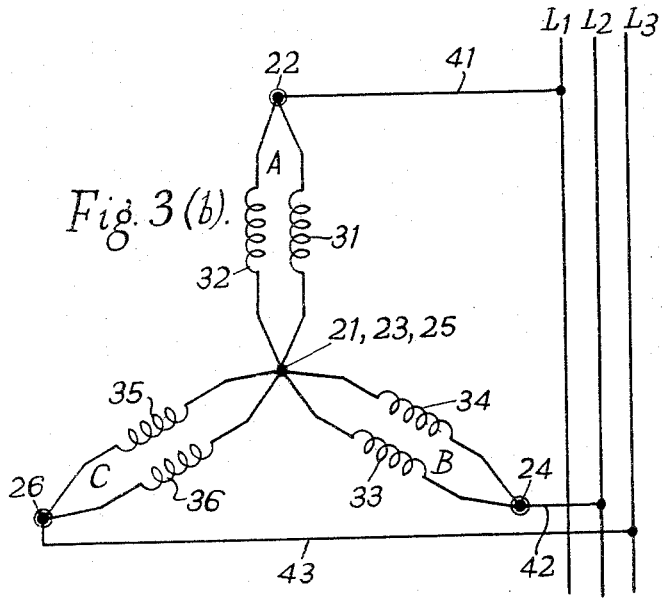
Figure 3A:
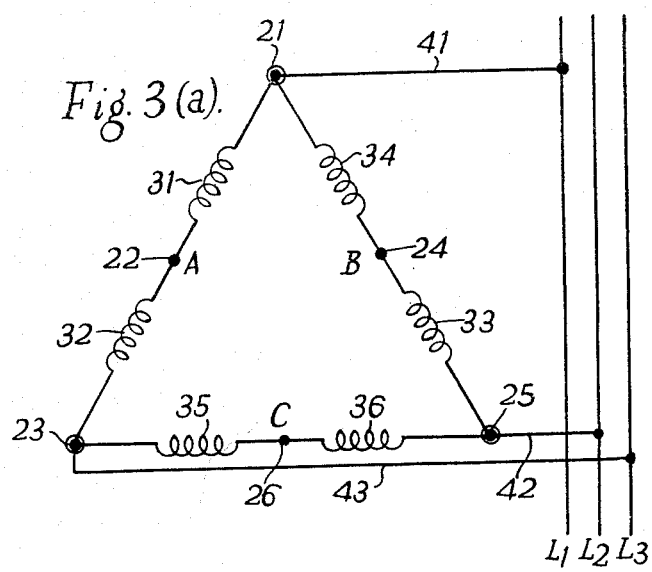
Figure 4:
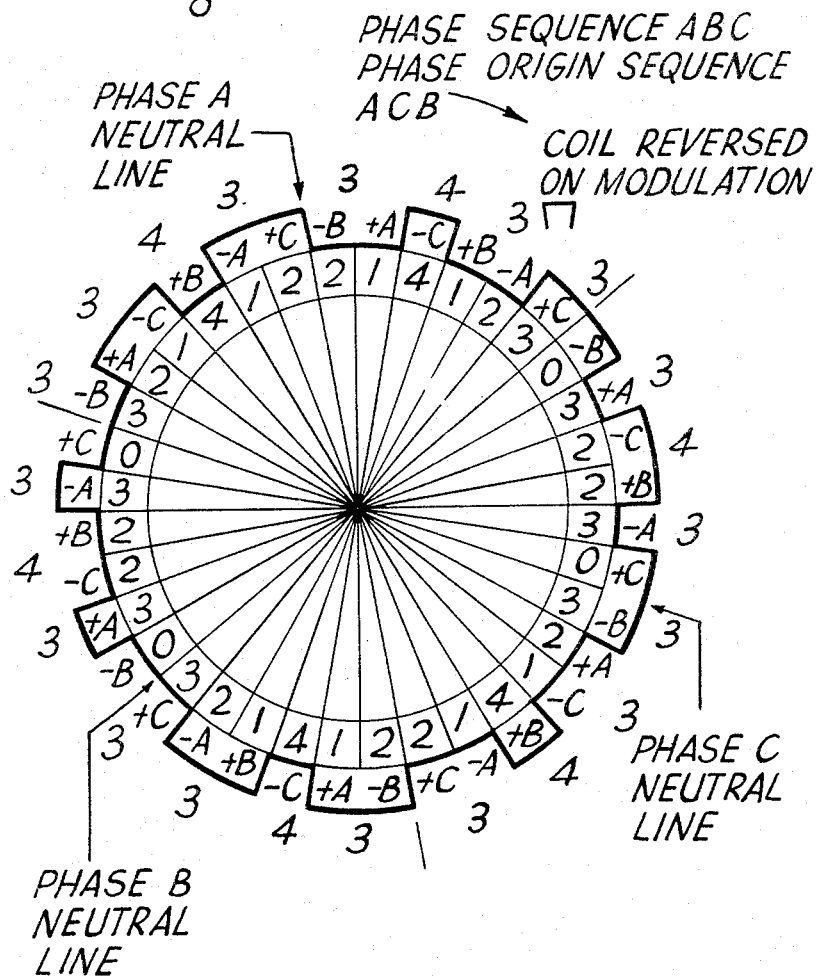

FIGS. 3(a) and 3(b) are circuit diagrams showing respectively the alternative series-delta 8-pole and parallel-star 6-pole connection of the machine of FIGS. 1 and 2;

FIG. 4 is a clock diagram for the 12-pole/10-pole machine wound on a 72-slot frame, which is Example 1 of Table B.1;

FIG. 5 is a slot winding diagram for the 12-pole/10-pole machine of FIG. 4;

FIGS. 6 through 9 show respectively Tables A.1 through A.4 setting out figures for the construction and performance of seven 8-pole/6-pole machines wound on frames of different slot-numbers;

FIGS. 10, 11 and 12 show respectively Tables B.1 through B.3 setting out figures for the construction and performance of nine 12-pole/10-pole machines wound on frames of different slot-numbers.

It is of value, at this point, to review the fact that any machine providing pole-changing by pole-amplitude modulation, provides an unmodulated pole-number of $2n$ poles and modulated pole-numbers of $(2n \pm 2m)$ poles, where $n$ is the number of pole-pairs for which the winding is originally wound and $m$ is the number of cycles to the modulation waves applied to each phase-winding.

Since the pole-number $2n$ is provided without modulation and both the pole-numbers $(2n+2m)$ and $(2n-2m)$ are produced by modulation, it follows that every such machine involves one, and only one, pole-number which is a multiple of three.

If this pole-number is the eliminated modulated pole-number, leaving two alternative pole-numbers neither a multiple of three, the method of symmetrical pole-amplitude modulation applies and the present invention does not relate to such cases.

If the pole-number which is a multiple of three is one of the alternative pole-numbers, either by reason of its being the unmodulated pole-number or by reason of its being the modulated pole-number which is not eliminated, then the resultant pole-number combination is one which can be obtained in a machine according to the present invention.

Furthermore, any one pole-number combination will provide many different machines, according to the number of slots chosen for the frame on which the 3-phase winding is wound. Still other variants will be seen from the following description.

It is obviously not practical, and not necessary, to describe all possible embodiments of the invention. Accordingly, two tables of data are provided herein for machines of two pole-number combinations, respectively. Each table sets out data for windings on frames of different slot-numbers for the pole-number combination concerned.

One example is then chosen from each table for a fuller description, the relevant clock-digram, slot winding diagram and circuit diagram being given.

Accordingly, Tables A.1 to A.4 are four parts of a single Table A describing the construction of seven machines providing 8-poles in unmodulated connection. In the modulated connection of the windings, 6-poles and 10-poles are provided together. The 10-pole field is eliminated, by reason of choice of the phase-winding sequence, and the operative modulated pole-number is 6-poles, therefor.

Table A.1 lists the data for 8-pole/6-pole machines wound in frames of 48-slots and 60-slots. Table A.2, for machines wound in frames of 72-slots and 84-slots. Table A.3, for machines wound in frames of 96-slots and 108-slots and Table A.4, for a machine wound in a frame of 120-slots. The slot-number is shown at the head of the table.

All the machines described are fractional-slot machines having coil-groups of different numbers of coils for poles of the same phase and different coil-grouping for each of the three phases.

Under the common heading "Phase-grouping" the coil grouping is given successively for each pole around the machine perimeter for each of the three phases A, B and C. The sequences given are as read clockwise from the neutral lines.

The next line of the tables, under the heading "Total modulating cycle" gives the overall pattern of reversed coils provided by the modulated connection, regardless of the phase-windings concerned. The sequences given are taken from the phase-A neutral line and extend clockwise round one-half of the machine perimeter. This sequence can be seen in diagrammatic form, for the 72-slot frame example, in FIG. 1.

Next are tabulated five values relating to the unmodulated, 8-pole, series-delta connection of the phase-windings.

Next thereafter are tabulated the corresponding five values relating to the modulated, 6-pole, parallel-star connection of the phase-windings.

The remaining figures of the tables are divided according to the two alternative variants defined by the coil-pitch used. The coil-pitch in each case is defined as a number of slots.

Chording and winding factors are given for both variants and for both pole-numbers. The 22-pole harmonic figure is given for both variants.

The final values are expressed as the ratio of the 8-pole flux to the 6-pole flux, assuming series-delta 8-pole and parallel-star 6-pole alternative connections.

FIG. 1 is a clock-diagram defining the phase-windings of the 8-pole/6-pole machine wound on a 72-slot frame forming Example 1 of Table A.2.

The phase sequence, in clockwise sense, is A, B, C, defining a phase-band sequence +A, −C, +B, −A, +C, −B, in the same sense, as shown in the diagram.

The neutral lines for phases A, B and C are indicated, showing the phase origin sequence to be A, C, B, in clockwise sense.

From the prior art theory of pole-amplitude modulation, referred to earlier, and from the fact that each phase is modulated by a single-cycle modulating wave, it is known that the modulated pole-numbers produced simultaneously by the modulated connection are 6-poles and 10-poles. The phase origin sequence chosen shows that the higher pole-number is eliminated to leave the lower pole-number.

The coil-grouping in each phase-band is shown by the first circle of numbers, working radially outwards from the diagram centre. The phase-band reference is shown in the next circle.

Thus, the coil-grouping, in the clockwise sense from the phase A neutral line is: −B.3, +A.2, −C.5, +B.1, −A.4, +C.3, and so on. These figures will be seen to correspond to the coil-grouping figures in Table A.

A heavy perimeter line encloses the phase-bands which are reversed in the modulated connection and excludes those phase-bands which remain similarly connected as in the unmodulated connection.

The heavy perimeter line itself defines a cyclical pattern of coil reversal having 7 half-cycles in the half-perimeter, that is 14 half-cycles in the full perimeter. The outer circle of figures shows the coil numbers for each half-cycle of this overall modulating pattern, regardless of the phase-bands concerned. It will be noted that the half-cycles are not completely regular but are symmetrical in each half-perimeter and are duplicated in the two half-perimeters. The outer circle of figures will be seen to correspond to the figures for "Total modulating cycle" given in Table A.

The clock diagram of FIG. 1 relates to both the coil-pitch variants of either 12-slot coil-pitch or 13-slot coil-pitch given in Table A.

FIG. 2 shows the slot winding diagram of the 8-pole/6-pole machine variant using the 12-slot coil-pitch, that is the coil-pitch is slot 1 to slot 13, and so on throughout.

The slot numbers are shown at the top of the figure. The phase-band coil-groupings are shown below and correspond to the figures given in FIG. 1 starting at the top, or bottom, of the diagram with phase-band +A and moving clockwise. The phase-bands in brackets are those reversed in modulated connection, as also shown in FIG. 1.

The windings show phase-winding A in full line, phase-winding B in broken line and phase-winding C in "X" line.

The windings are referenced near the end-terminals, for convenience, and the terminals are numbered showing the end-terminals and centre tap for all three phase-windings.

The windings and terminals are correspondingly numbered as in FIGS. 3(a) and 3(b), wherein the series-delta, unmodulated, 8-pole and the parallel-star, modulated 6-pole connections are shown respectively.

In FIGS. 3(a) and 3(b), supply leads 41, 42 and 43 to the three phase-lines $L_1$, $L_2$ and $L_3$ respectively, are shown.

It is to be particularly noted in FIGS. 1 and 2, that all the coils of all the phase-windings are connected in circuit for both the unmodulated, 8-pole and modulated, 6-pole connections. The omission of coils in the modulated connection, as required in the prior art embodiments, with the consequent arrangement of the omitted coils in a phase-winding branch, is avoided by the present invention. In consequence, the simple series/parallel connection of each phase-winding can be used for the unmodulated and modulated connections, as shown in FIGS. 3(a) and 3(b). This feature characterises all the examples given in Table A and, indeed, all examples of the present invention.

Tables B.1 to B.3 are three parts of a single Table B describing the construction of nine machines providing 12-poles unmodulated. In the modulated connection of the windings, 10-poles and 14-poles are produced together. The 14-pole field is eliminated, by reason of choice of phase-winding sequence, and the operative modulated pole-number is 10-poles, therefore.

Table B.1 lists the data for 12-pole/10-pole machines wound in frames of 72-slots, 84-slots and 96-slots. Table B.2, for machines wound in frames of 108-slots, 120-slots and 132-slots and Table B.3, for machines wound in frames of 144-slots, 156-slots and 168-slots. The slot-number is shown at the head of the table for each machine.

All the machines described are fractional-slot machines having coil-groups of different numbers of coils for poles of the same phase and different coil-grouping for each of the three phases.

Under the headings "coil-group arrangement" the coil-grouping is given successively for each pole around the machine perimeter for each of the three phases A, B and C. The sequences given are as read clockwise from the corresponding phase neutral lines. The sequence defines the half-perimeter of the machine and is repeated identically for the second half-perimeter.

The next line of the tables, under the heading "Total modulating wave for semi-perimeter" gives the overall cyclical pattern of reversed coils providing the modulated connection, regardless of the phase-windings concerned.

Reference should be had to FIG. 4, where this sequence is shown diagrammatically for the 72-slot frame machine.

The sequences given start from the phase A neutral line and extend clockwise round half the machine perimeter. The sequence is repeated identically for the half-perimeter.

Next are tabulated five values for the 12-pole, unmodulated, connection and, following, the corresponding five values for the 10-pole, modulated, connection.

The remaining figures of Table B are divided into two columns, for all except the 72-slot frame machine. These define two variants for each slot-number, according to the coil-pitch used. The coil pitch in each case is defined by the number of slots. In most examples there are three possible variants with coil-pitch differing by one slot from one another. For the 84-slot and 96-slot machines two variants are possible and for the 168-slot machine four variants. In all examples providing three or more coil-pitch variants, the figures for the extreme cases are given in the table.

It should be noted that the shortest, or shorter, coil-pitch gives the maximum winding factor and hence the maximum pull-out torque but the shortest coil-pitch gives the largest percentage of 17th harmonic backward-crawling torque and hence the lowest starting torque. The largest, or larger, coil pitch gives minimum 17th harmonic content. The 12-pole and 10-pole winding factors and 17th harmonic content at 10-pole working are given for each coil-pitch variant.

The final figure expresses the ratio of 12-pole flux to 10-pole flux assuming series-delta connections for 12-poles and parallel-star connections for 10-poles.

FIG. 4 is a clock-diagram defining the phase-windings of the 12-pole/10-pole machine wound on a 72-slot frame forming Example 1 of Table B.1.

The phase sequence, in the clockwise sense, is A, B, C defining a phase-band sequence +A, −C, +B, −A, +C, −B in the same sense, as shown in the diagram.

The neutral lines for phases A, B and C are indicated, showing the phase origin sequence to be A, C, B in the clockwise sense.

The modulating wave applied to each phase-winding, that is the cyclical pattern of coil reversal, has two half-cycles. From prior art pole-amplitude modulation theory, and since the unmodulated pole-number is 12-poles, the modulated pole-numbers are 14-poles and 10-poles together. The phase origin sequence A, C, B being the reverse of the phase sequence, A, B, C, it is known that the higher modulated pole-number of 14-poles is eliminated from the 3-phase field to leave the 10-pole modulated pole-number.

The coil-grouping in each phase-band is defined by the inner circle of numbers. The phase-band concerned is shown by the reference in the next circle outwards.

The coil-grouping, moving clockwise from the phase A neutral line, is thus seen to be —B.2, +A.1, —C.4, +B.1, —A.2, +C.3, —B.0, and so on, correspondingly to the coil-grouping figures given in Table B.

A heavy perimeter line encloses the phase-bands which are reversed in circuit for the modulated, 10-pole, connection. The heavy perimeter line excludes the phase-bands which remain energised in the same sense for both 12-pole and 10-pole working.

The heavy perimeter line itself defines a cyclical pattern of coil-reversal for modulation which, ignoring the phase-bands grouped in various half-cycles thereof, has 11 half-cycles in the half-perimeter, 22 half-cycles in the full-perimeter.

The outer circle of figures shows the coil-grouping in each half-cycle of the overall modulation wave defined by the heavy perimeter line, again ignoring the grouped phase-bands. The sequence defined by these figures, moving clockwise from the phase A neutral line, will be seen to correspond to the "total modulating wave for semi-perimeter" sequence given in Table B.

FIG. 5 shows the slot winding diagram, corresponding to the clock-diagram of FIG. 4 for the 12-pole/10-pole machine using a 72-slot frame, which is Example 1 of Table B.1.

The slot numbers, from an arbitrary origin chosen as phase-band +A, are shown at the top of the figure. Immediately below are shown the phase-bands and the coil-grouping thereof correspondingly to FIG. 4 and the figures in Table B. The phase-bands in brackets are those reversed in circuit for 10-pole working and correspond to those shown in the clock-diagram of FIG. 4.

The windings show the coil-pitch of 8-slots, that is slot 1 to slot 9 and so on, used throughout. Phase-winding A is shown in full line, phase-winding B in broken line and phase-winding C in "X" line.

The phase-winding halves are referenced near the end-terminals, for clarity, and the terminals are numbered to indicate start, centre-tap and end of each phase-winding.

The windings and terminals are correspondingly numbered as in FIGS. 3(a) and 3(b), wherein the alternative series delta, unmodulated, and parallel-star, modulated connections are shown, respectively, in this case for 12-poles and 10-poles, respectively.

Again, it is to be noted that all coils are identical throughout the machine and all coils are energised, in one current sense or the other, for both 12-pole and 10-pole working. No coils are omitted from circuit for the modulated pole-number working, as was required for the prior art machines.

What I claim is:

1. A pole-changing rotary electric machine having a three-phase winding providing a first pole-number of P pole-pairs and a second pole-number selected from the pole-numbers (P+M) pole-pairs and (P—M) pole-pairs, where M is the number of cycles of a modulation wave around the winding circumference, one of said first and second pole-numbers being an even multiple of three, the said winding comprising three phase-windings sequentially arranged around an axis, the electrical phase-sequence A, B, C and phase-band sequence +A —C +B —A +C —B defining a reference sense of rotation around said axis, said phase-bands comprising coils connected together to provide P pole-pairs in a first, that is to say unmodulated, manner of connection, switch means for connecting selected coils in an alternative, that is to say modulated, manner of connection to modulate the relative amplitudes of said P pole-pairs according to three pole-amplitude modulation waves applied one to each of the three phase-windings in spaced relationship, each pole-amplitude modulation wave comprising M cycles of alternate positive and negative parts following sequentially from an origin, said positive and negative parts being identified by reversal of polarity of the poles of said negative part relative to the poles of said positive part, the spaced relationship of said pole-amplitude modulation waves being such as to space the origins thereof at three original points spaced apart substantially one-third of a revolution around said axis, the sequence of the pole-amplitude modulation waves at said three original points being in the phase sequence A, B, C, in the said reference sense of rotation, when said second pole-number is (P+M) pole-pairs and being in the phase sequence A, C, B, when said second pole-number is (P—M) pole-pairs, wherein the three-phase winding is a fractional-slot winding, the pole-pairs at at least one end of each half of each phase-winding having fewer coils than the pole-pairs at the centres thereof, wherein the coil-grouping sequence of phase-winding A is symmetrical about the centre of each half phase-winding and the coil-grouping sequences of phase-windings B and C are asymmetrical about the centre of each phase-winding, and wherein the said alternative, that is to say modulated, manner of connection of the coils comprises reversing in circuit selected whole phase-bands.

2. A rotary electric machine as claimed in claim 1, wherein the coil-grouping sequence of phase B is the reverse sequence of phase C.

3. A rotary electric machine as claimed in claim 2, wherein said alternative manner of connection of the coils comprises reversing in circuit at least one, but not all, of any three consecutive phase-bands.

4. A rotary electric machine as claimed in claim 3, in which all coils of all phase-bands have an equal number of turns.

5. A rotary electric machine as claimed in claim 4, in which the selected phase-bands reversed in circuit form a wave pattern of alternate half-cycles defining reversed and non-reversed coils around the whole of the three-phase winding, some of the half-cycles comprising the coils of two consecutive phase-bands, the total number of coils being substantially equal in all half-cycles.

6. A rotary electric machine as claimed in claim 5, in which the total numbers of coils in any two half-cycles differ by one coil only.

References Cited by the Examiner
UNITED STATES PATENTS

| | | | |
|---|---|---|---|
| 2,715,204 | 8/55 | Siskind | 318—224 |
| 2,820,938 | 1/58 | Davies | 318—224 |
| 2,850,690 | 9/58 | Rawcliffe | 318—224 |
| 3,016,482 | 1/62 | Anderson | 318—224 |
| 3,070,734 | 12/62 | Rawcliffe | 318—224 |

JOHN F. COUCH, *Primary Examiner.*